UNITED STATES PATENT OFFICE.

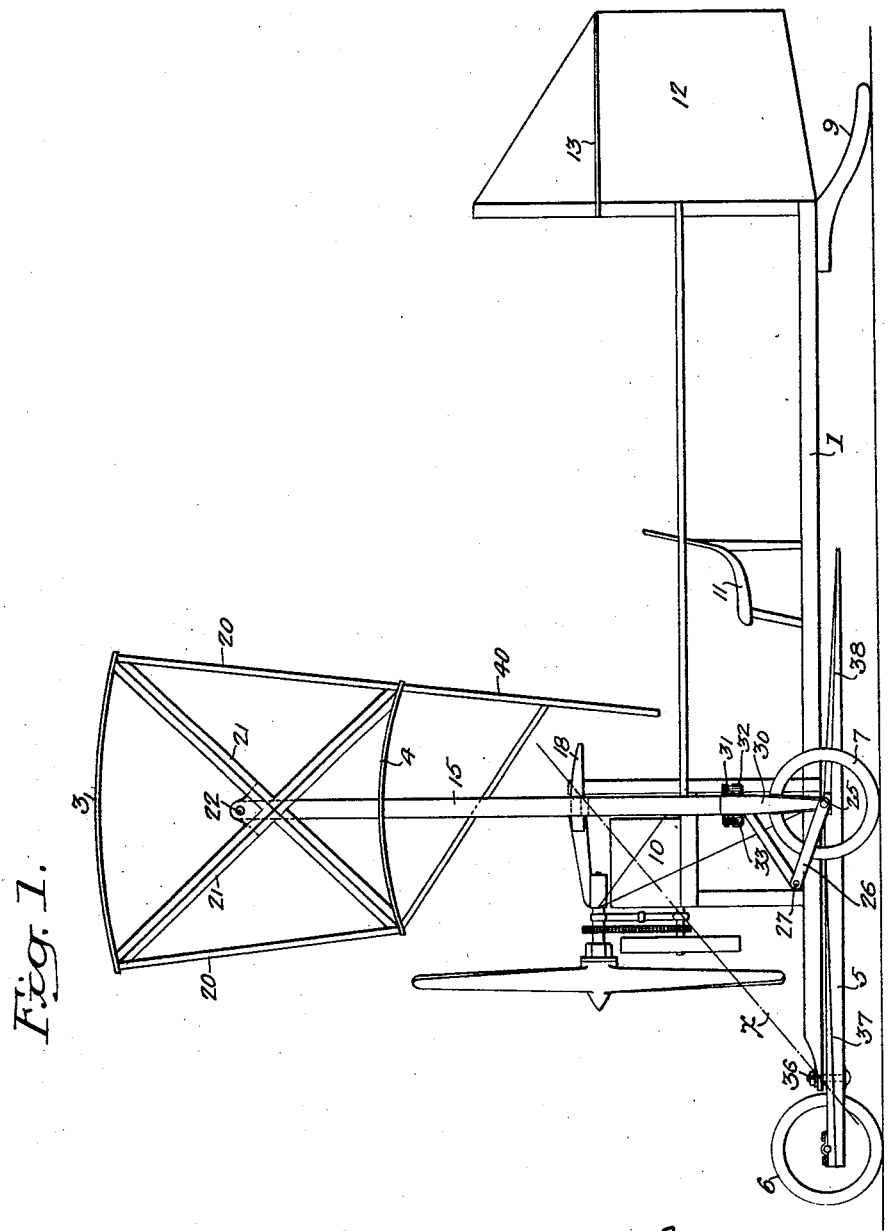

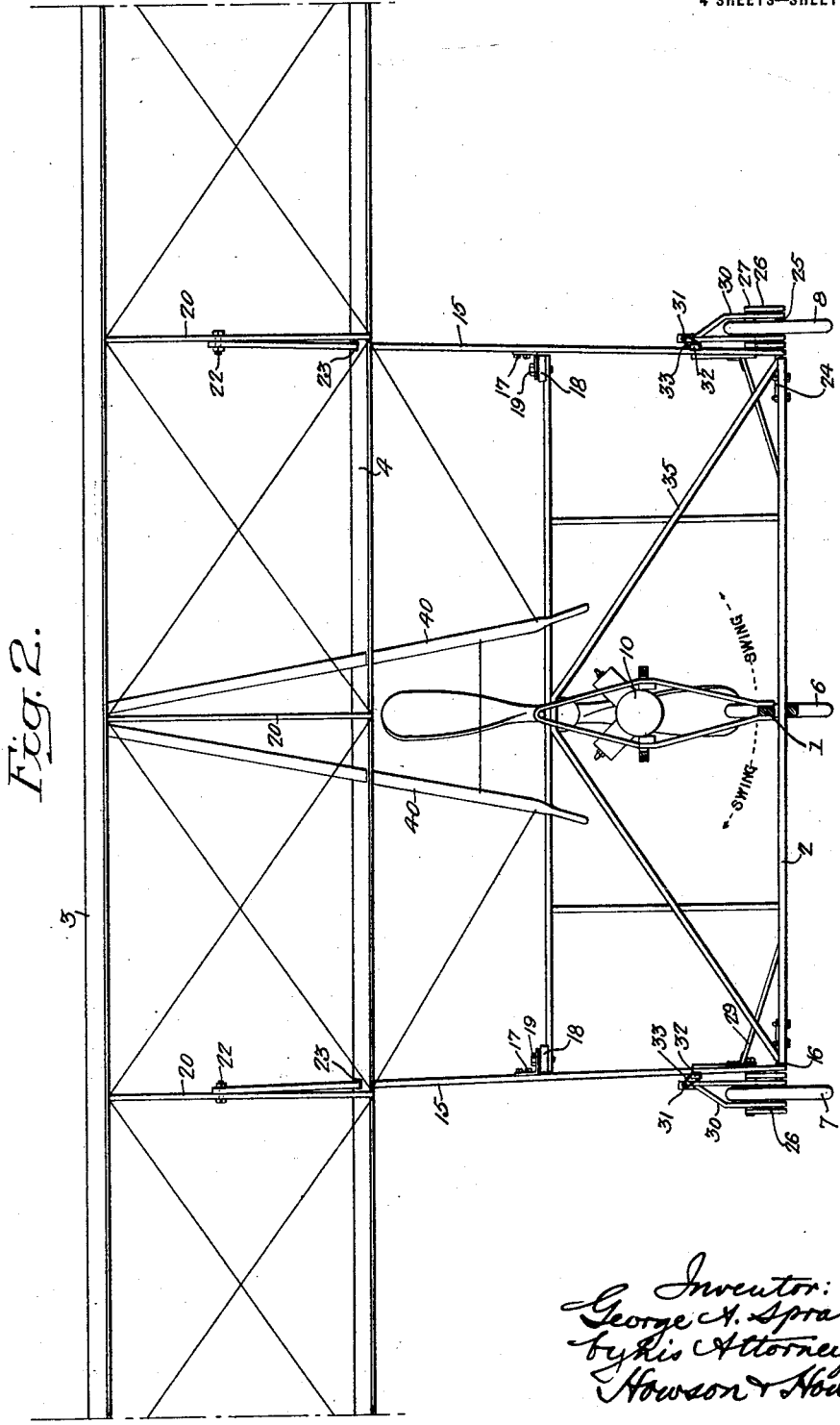

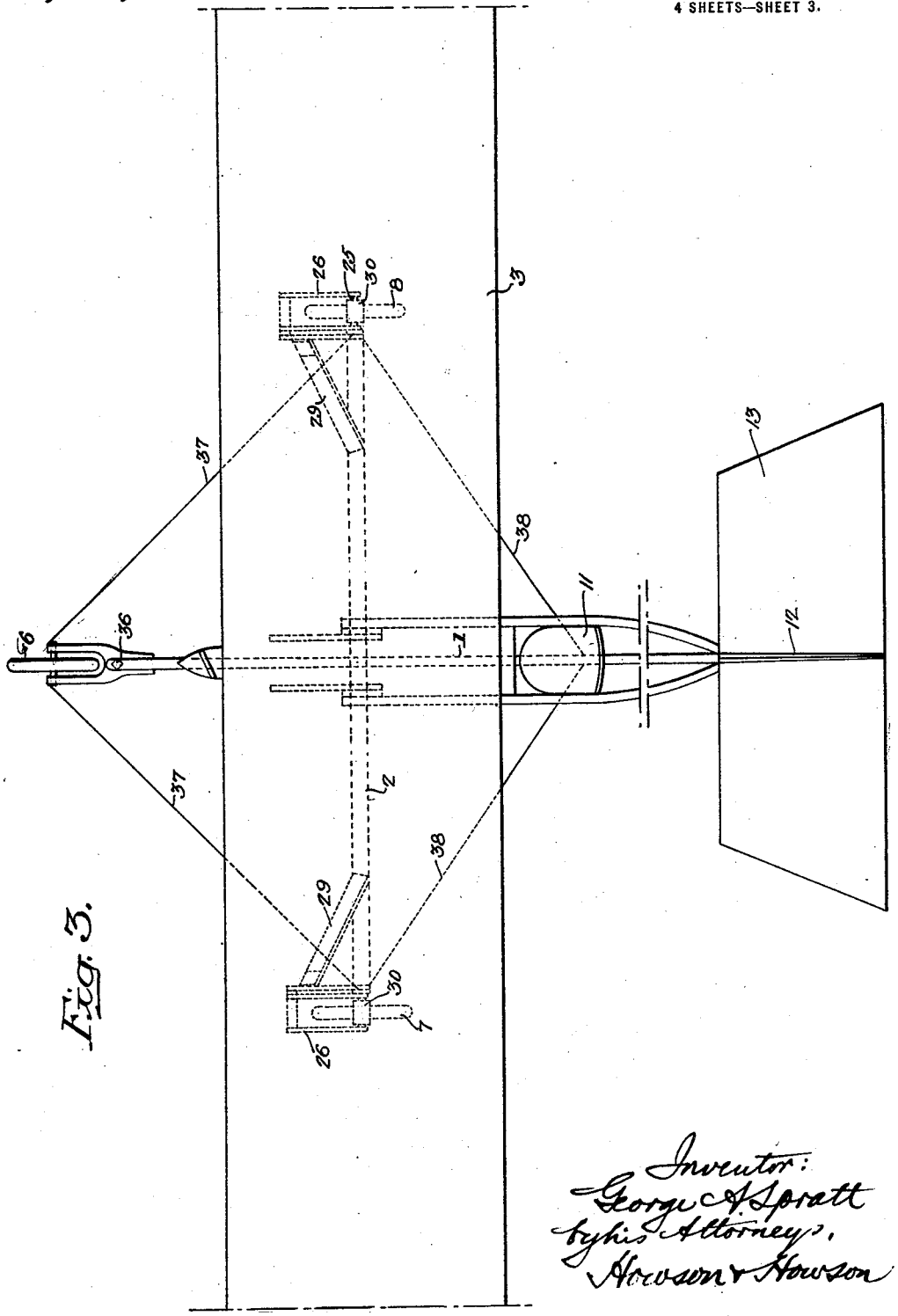

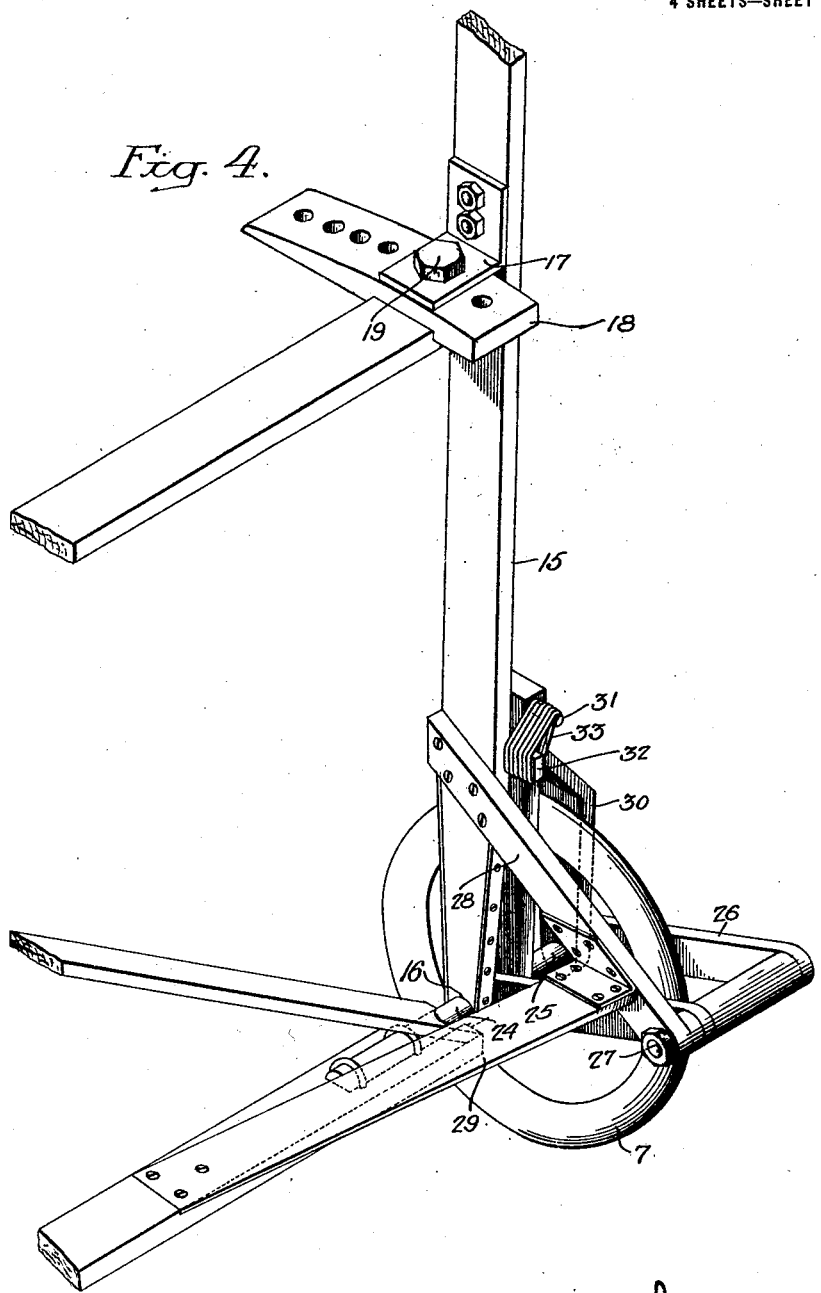

GEORGE A. SPRATT, OF COATESVILLE, PENNSYLVANIA, ASSIGNOR OF ONE-HALF TO H. W. SMITH, OF WEST CHESTER, PENNSYLVANIA.

AEROPLANE.

1,331,289.  Specification of Letters Patent.  Patented Feb. 17, 1920.

Application filed September 5, 1918. Serial No. 252,780.

*To all whom it may concern:*

Be it known that I, GEORGE A. SPRATT, a citizen of the United States, residing in Coatesville, Chester county, Pennsylvania, have invented certain Improvements in Aeroplanes, of which the following is a specification.

My invention relates to areoplanes and more particularly to fore and aft stability and control.

The following briefly stated theory is the basis for the hereinafter described structure: The frictionless pressures upon a circularly arched surface, being normal to the surface, coincide with the radii in direction, and from all points are directed through the common center of the radii. The resultant force of the pressures, therefore, passes through the common center of the radii, regardless of the angle of incidence, the intensity, or the distribution of the pressures upon the surface. The possibility of their producing torque around this point is, therefore, non-existent.

If the circularly arched surface is considered to be a frictionless aerofoil of an aeroplane whose mass and resistance center is at the common center of the radii, (in the axis of the common center of the radii, and midway of the extremities), no wind force, whatever may be its angle of incidence, intensity, or distribution upon the aerofoil can alter the chord's angle relative to the horizon, and neutral equilibrium remains undisturbed.

As the mass center of such an imaginary structure is conceived to assume a position advanced relatively to the common center of the radii, a negatively acting torque is introduced, for gravity acts through the mass center while the opposing supporting pressure acts through the common center of the radii. Likewise a rearward movement of the mass center relatively to the common center of the radii introduces a positively acting torque.

The force of gravity, which never varies in direction nor intensity, thereby becomes the source of control, whereas, in the present type of aeroplane, a tail vane fixed relatively to the aerofoils, (the stabilizer), causes the device to aline its chord at some definite angle with the encountered current direction without recognition of a more definite direction. Such device can be designed to be horizontally stable at but one angle of incidence, and that in calm air only, and control is obtained only as a product of the speed at the angle of design.

The drag of the areofoil in an actual structure gives rise to a positively acting torque, and constitutes a barrier to the perfect fulfilment of the above theory. Besides avoiding such pressures as far as possible, they may be counteracted: 1st, by locating the mass center sufficiently high above the common center of the radii as to produce an equally acting negative torque; 2nd, by introducing a drag of equal moment below the mass center, such as that of the landing device, or, 3rd, by combining both means. With these counteracting forces it is possible to fulfil the conditions to a very practical degree, and in any given design of structural elements, the point to which the mass center needs to be elevated to give the best results in flight, is the point referred to in the appended claims as "the point of least torque".

The essential features of my aeroplane structure comprehend two parts; a frame or body, and a "surface" structure disposed above the frame or body. The "surface" structure may include a plurality of "surfaces" or "planes" which are, in all instances, no matter what the distance between them may be, substantially concentric to each other, or arched substantially from a single axial point.

These and other features of my invention are more clearly set forth hereinafter, reference being had to the accompanying drawings showing my improved structure more or less diagrammatically in which:

Figure 1, is a plan view of an aeroplane structure within the scope of my invention; the same being shown as having a plurality of surfaces.

Fig. 2, is a rear elevation of my improved aeroplane structure.

Fig. 3, is a side elevation thereof, and

Fig. 4, is a perspective view illustrating certain details of construction.

Broadly considered, the frame of my improved aeroplane structure in ground plan is substantially in the form of a cross, and may comprehend a trussed structure 1 disposed fore and aft, with a lateral truss 2 disposed at right angles thereto, beneath and substantially in line with the longitudinal axis of the surfaces 3 and 4 when the latter are in their normal or vertical position. Below the trussed frame, of course, I provide a suitable form of supporting means which may include a frame 5 having a wheel 6 mounted at the forward end of the fore and aft truss framing, with other wheels 7 and 8 mounted at suitable points in the rear of the wheel 6, and operatively connected to the lateral truss 2; the whole comprehending a suitable wheel base for which, as may be well understood, a pontoon or other floating structure may be substituted. A rear support for the fore and aft truss 1 may be provided in the form of a skid 9.

The fore and aft truss 1, as well as the lateral truss 2 constituting the frame of the aeroplane structure are well braced and connected together so that slight movement on the axis $x$ with respect to each other may occur, and such portion 1 of the frame supports the driving means, which may be any suitable type of motor indicated at 10, as well as the seat or other support 11 for the operator. In addition, the fore and aft truss may carry a tail vane made up of the vertical surface 12 and a horizontal surface 13 adjacent the top of the same and which may be disposed at about the height of the propeller, or substantially at the height of the center of weight of the whole structure.

The lateral truss may be substantially half the length of the planes or surfaces, and disposed at the ends of the same and forming connecting means for the upper and lower chords of said truss, are vertically disposed masts or struts 15; the upper portions of which may have slight fore and aft adjustment with respect to said truss. For this purpose the masts may be pivotally connected to the lower chord of the truss and have adjustable securing means which may comprise brackets 17 adapted to be connected with segmental members 18 carried by the upper chord of the truss; pins 19 being provided for the purpose.

Above the frame of the aeroplane I provide the substantially concentric surfaces 3 and 4, whose arcs are struck substantially from the same axial point; such surfaces being properly braced between each other by the struts 20, and additionally provided with cross braces 21. The upper ends of the masts 15 are preferably connected to said cross braces at 22.

This connection or engagement is slightly above the axis of the center of weight of the surface member so that when at rest, the surface or surfaces may "hang" in proper poise. The hinged connection of the surface member with the masts 15 allows such surface member to swing to increase or decrease the angle of incidence only; the slots 23 in the lower surface (when employed) through which the masts pass allow for positive and negative rotation; about 10° negative and about 15° positive angle of rotation. These masts have no side motion, but are held perpendicular to the axis of the surface structure. The lower ends of the masts are pivotally connected at 16 to the lower chord of the lateral truss; such arrangement allowing the upper ends of said masts to rock fore and aft. To provide these pivotal connections, the lower chord of the truss may have extensions 24 as clearly shown in Fig. 4. The upper chord of the lateral truss is connected at its ends with the masts in the manner above described, which permits the masts being secured either vertically upright, or inclined rearwardly at an angle. This adjustment may be readily effected by the operator from the seat, or made before flight is commenced.

The wheels 7 and 8 may be mounted on shafts 25, carried by yokes 26 connected together by pins 27, which pins may be carried at the ends of struts 28 secured to the masts 15 and braced from the lower chord of the lateral truss by the pieces 29. The inner ends of the side pieces forming the yokes 26 may be connected to vertically disposed yokes 30, which may be flexibly connected to the masts 15. For this purpose, such yokes 30 may have pins 31 and the masts may have projections 32, around which an elastic member in the form of a rubber band 33 may be wrapped. In lieu of this arrangement a spring may be employed to connect the yokes 30 and the masts 15. By this means, the wheels may respond to any jar when passing over uneven ground or when alighting without affecting in any way any other part of the aeroplane structure.

The shifting sidewise and sluing of the surface member may be accomplished by hanging the car body from the apex of the diagonal braces 35 of the lateral truss frame as shown. The forward extremity of the fore and aft truss is pivotally attached (loosely) at 36 to the frame 5 which is secured by guy wires 37 and 38 to the ends of the lateral truss. The framing which includes the car or support for the operator therefore may swing on the dotted diagonal line $x$ as an axis; such axis passing through the sprocket wheel on the engine shaft.

The fore and aft truss carries the engine and operator, and at its rear the tail vane and the skid 9 which acts against the ground as a brake, in landing. The gasolene tank preferably should be above the point of suspension of the car, but may be mounted on the cross piece of the lateral truss if desired.

Handles 40 extend downward from the surface member in easy reach of the operator. By pushing or pulling upon such handles, the angle of incidence of the surface member is controlled, and by drawing the handles sidewise the car may swing on the diagonal axis $x$; drawing the weight center sidewise and sluing the surfaces in the manner desired.

I claim:

1. An aeroplane consisting of a circularly arched surface or plane, supporting members to which the arched surface is pivotally connected, a base structure to which the supporting members are pivotally connected; said arched surface or plane being mounted above the base structure and being capable of limited movement with respect to and independently of the latter.

2. An aeroplane comprising a transversely disposed, circularly arched surface or plane, supporting means pivotally connected to the arched surface, and a base structure including a fore and aft portion and a lateral truss with which said supporting means are in pivotal engagement pivotally connected to the supporting members; said arched surface or plane being mounted above the base structure and being capable of limited fore and aft and transverse movement with respect to and independently of the fore and aft portion of said base structure.

3. An aeroplane comprising a circularly arched aerofoil, supporting means to which said aerofoil is pivotally connected, a base, and means for rocking said aerofoil with respect to the supporting means and base; the weight center of the whole being disposed below the aerofoil substantially at the point of least torque as herein defined.

4. An aeroplane comprising circularly arched and concentrically arranged aerofoils, supporting members to which said aerofoils are pivotally connected, a base, and means for rocking said aerofoils with respect to the supporting members and base; the weight center of the whole being disposed below the aerofoils substantially at the point of least torque as herein defined.

5. An aeroplane comprising a trussed frame extending fore and aft, a trussed frame connected thereto and extending laterally thereof, a pair of masts carried by one of said frames, a plurality of concentrically arranged circularly arched surfaces pivotally connected to said masts, and pivotal connections between said masts and one of said frames.

6. An aeroplane comprising an arched surface, supporting masts therefor; said arched surface being mounted partly above the supporting masts and being pivotally connected thereto, a frame carrying a motor, a second frame connected therewith and movable with respect thereto, and a pivotal connection between said second frame and the supporting masts for the arched surface.

7. The combination, in an aeroplane, of a plurality of arched surfaces, a supporting framework, masts between said framework and the surfaces, pivotal connections between said supporting masts and frame; said surfaces being pivotally connected to the masts and rockable with respect thereto, and a tail vane carried by said framework and having a vertical and a horizontal surface.

8. In a flying machine, a plurality of circularly arched planes, a base or supporting structure, a pivotal connection between said planes and the supporting structure; the planes being capable of limited rocking movement independently of said supporting structure, and means under the control of the operator for tilting said planes fore and aft with respect to said base or supporting structure.

9. In a flying machine, a pair of masts, a plane carried thereby, a base or supporting structure, pivotal connections between said plane and the masts and between the latter and the supporting structure; said plane being capable of limited rocking movement independently of said supporting structure, and means under the control of the operator for rocking said plane with respect to said base or supporting structure.

10. In an aeroplane, the combination of a wheeled base frame, masts pivotally connected thereto, a second frame pivoted to the first; said second frame carrying an engine and the operator's seat, a plane or surface pivotally connected to said masts, and means carried by the plane structure whereby it may be rocked by the operator; said second frame permitting movement of the same with respect to the wheeled base frame by imparting lateral thrust to the plane or surface.

11. In an aeroplane, the combination of a wheeled base frame, a second frame pivoted to the first; said second frame carrying an engine and the operator's seat, adjustable masts connected to the wheeled base frame, a plurality of planes or surfaces carried by said masts, means carried by the surface member whereby it may be rocked fore and aft by the operator; said second frame permitting movement of the same with respect to the wheeled base frame by imparting lateral thrust to the surface member or planes, and pivotal connections between said surface member and the masts.

12. In an aeroplane, the combination of a wheeled base frame, masts pivotally connected thereto, a second frame pivoted to the first, said second frame carrying an engine and the operator's seat, adjustable connections between said masts and the first-named frame, a surface member pivotally connected to said masts, and means carried by the plane structure whereby it may be rocked by the operator with respect to the masts.

13. In an aeroplane structure, the combination of a lateral and a fore and aft truss connected together; masts pivotally connected to the lower chord of the lateral truss and movable with respect to the upper chord thereof, adjustable connections between said mast and the upper chord, and a surface member hung from the upper ends of said masts; said surface member being rockable fore and aft on its connections with said masts.

14. In an aeroplane structure, framing including a lateral truss and a fore and aft truss, a surface member, masts pivotally connected to the fore and aft truss and supporting said surface member, supporting wheels operatively connected to the ends of the truss, and flexible connections between said masts and the wheels.

15. In an aeroplane structure, framing including a fore and aft truss, a surface member, masts pivotally connected to the fore and aft truss and pivotally connected to said surface member; means for adjusting said masts with respect to the truss, and means for rocking said surface member with respect to the masts.

16. An aeroplane comprising a circularly arched aerofoil, a body structure, an upright framing connecting said aerofoil and body structure; the weight center of the whole being disposed at such distance below the aerofoil that it substantially coincides with the point of least torque as herein defined, and means for guiding said structure.

17. An aeroplane comprising circularly arched aerofoils in concentric arrangement, a body structure, an upright framing connecting said aerofoils and body structure; the weight center of the whole being disposed at such distance below the aerofoils that it substantially coincides with the point of least torque as herein defined, and means for guiding said structure.

18. An aeroplane comprising circularly arched aerofoils in concentric arrangement, a body structure, an upright framing connecting said aerofoils and body structure; the weight center of the whole being disposed at such distance below the aerofoils that it substantially coincides with the point of least torque as herein defined, means for guiding said structure, and propelling means therefor suitably carried thereby.

GEO. A. SPRATT.